United States Patent [19]
Wilson et al.

[11] Patent Number: 5,208,675
[45] Date of Patent: May 4, 1993

[54] VIDEO CAMERA WITH INTEGRAL LIGHT ASSEMBLY

[75] Inventors: Anton Wilson, White Plains, N.Y.; Jeffrey P. Crouch, Terryville, Conn.

[73] Assignee: Anton/Bauer, Inc., Shelton, Conn.

[21] Appl. No.: 730,076

[22] Filed: Jul. 15, 1991

Related U.S. Application Data

[63] Continuation of Ser. No. 456,106, Dec. 26, 1989, abandoned.

[51] Int. Cl.$^5$ ............................................. H04N 5/30
[52] U.S. Cl. .................................. 358/209; 358/229; 362/8
[58] Field of Search ................ 358/209, 229, 909; 362/8, 10, 11, 3; 354/145.1, 149.11, 149.1

[56] References Cited

U.S. PATENT DOCUMENTS

| | | | |
|---|---|---|---|
| 3,374,342 | 3/1968 | Hutchins | 240/1.3 |
| 3,527,437 | 9/1970 | Lippman | 248/205 |
| 3,601,595 | 8/1971 | Kivela | 240/10.6 |
| 3,999,055 | 12/1976 | Wakahara et al. | 240/1.3 |
| 4,051,493 | 9/1977 | Nakagawa | 354/126 |
| 4,129,899 | 12/1978 | Dunbar | 362/109 |
| 4,219,870 | 8/1980 | Haraden et al. | 362/226 |
| 4,240,129 | 12/1980 | Kawazoe | 362/3 |
| 4,268,746 | 5/1981 | Johnson | 354/145 |
| 4,300,188 | 11/1981 | Addario | 362/226 |
| 4,376,967 | 3/1983 | Hough | 362/306 |
| 4,388,679 | 6/1983 | Blaisdell et al. | 362/306 |
| 4,544,621 | 11/1985 | Corrigan | 362/382 |
| 4,554,621 | 11/1985 | Corrigan | 362/382 |
| 4,819,016 | 4/1989 | Leonard et al. | 354/92 |
| 4,853,723 | 8/1989 | Akabane et al. | 354/145.1 |
| 4,855,771 | 8/1989 | Alligood et al. | 354/145.1 |
| 4,860,108 | 8/1989 | Saito et al. | 358/209 |
| 4,881,128 | 11/1989 | Yamada | 358/228 |

FOREIGN PATENT DOCUMENTS

| | | |
|---|---|---|
| 2841518 | 4/1979 | Fed. Rep. of Germany . |
| 57-78037 | 5/1982 | Japan . |
| 1-49378 | 2/1989 | Japan . |
| 1-168170 | 7/1989 | Japan . |

Primary Examiner—Herbert Goldstein
Assistant Examiner—Tuan V. Ho
Attorney, Agent, or Firm—Kramer, Brufsky & Cifelli

[57] ABSTRACT

A video camera comprises a video camera body and a light module. Structure is provided, integral with the video camera body, for selectively positioning the light module. The light module can be removably connected to the video camera body.

13 Claims, 4 Drawing Sheets

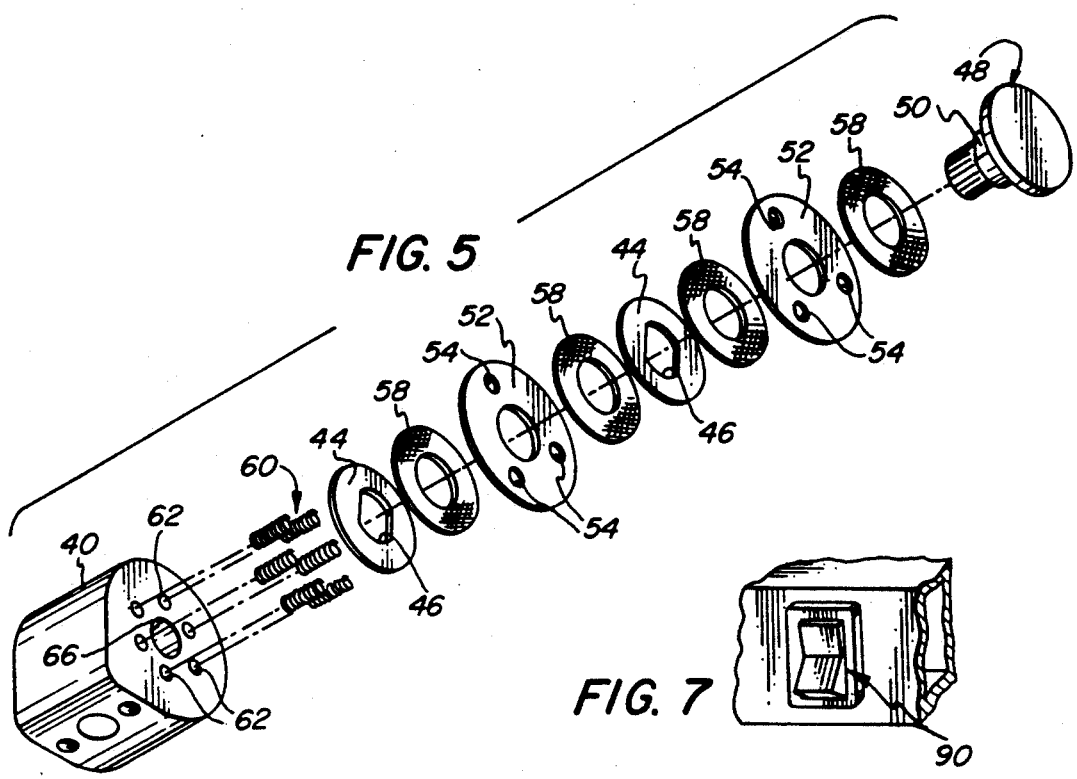
FIG. 5
FIG. 7
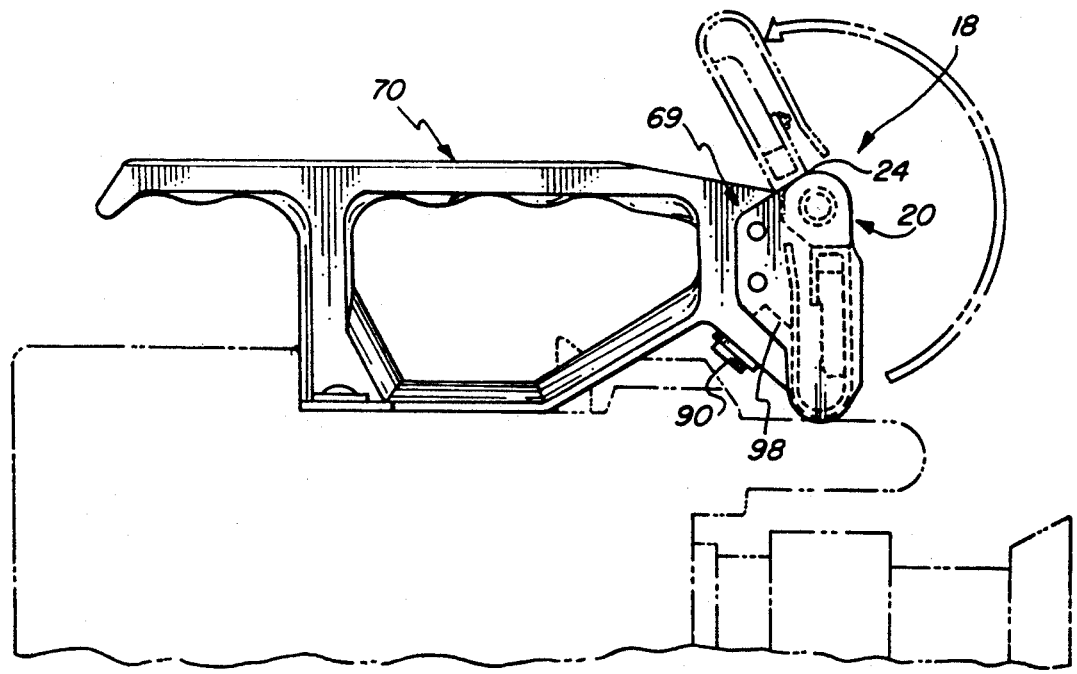
FIG. 6

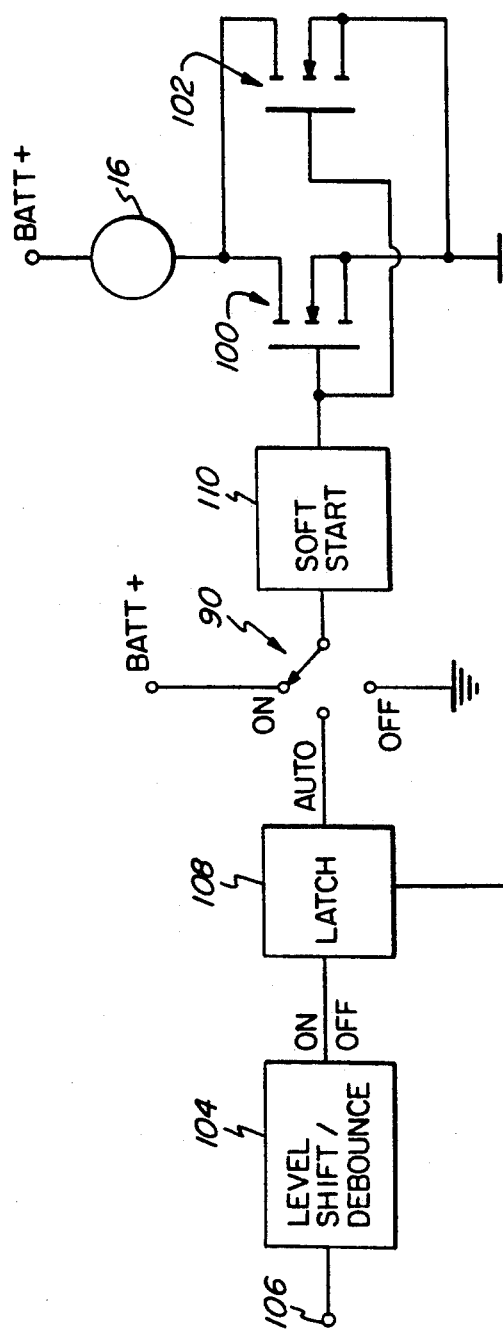
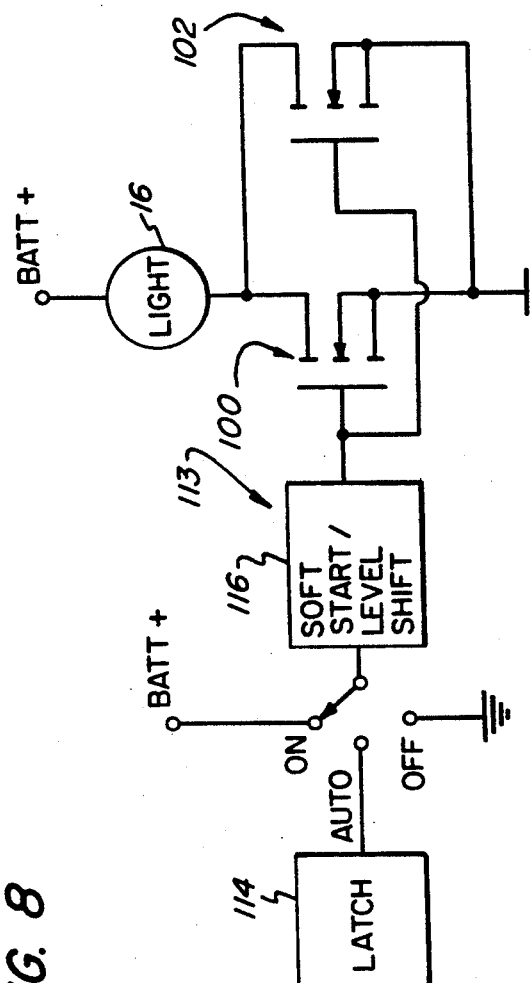
FIG. 8
FIG. 9

VIDEO CAMERA WITH INTEGRAL LIGHT ASSEMBLY

This application is a continuation of application Ser. No. 456,106, filed Dec. 26, 1989 now abandoned.

FIELD OF THE INVENTION

The invention relates to a video camera in combination with a modular light. In particular, a video camera is disclosed having a modular light integrally connected with the casing of the video camera in a manner so as to be pivotally attached to the camera body and receiving power from the same on-camera source (such as a battery) as the camera. Moreover, the modular light is able to be disposed in a non-use position where the lens and bulb is protected from being damaged.

DESCRIPTION OF THE PRIOR ART

State of the art video cameras are capable of creating the highest quality video images. However, it must be remembered that a video camera creates its electronic images from light. If the quality of the lighting (irrespective of the quantity of light) is poor, the video image will also be poor irrespective of the quality of the camera.

At the present time, virtually all location video makes use of available light at the filming location. Typically this can be in office buildings, such as those used by the government and industry where the illumination comes from overhead ceiling lights. This overhead lighting is perfectly adequate for the background but is unacceptable for the important foreground subjects such as people. Unlike professional studio lighting which comes from both the front and overhead, the top only lighting creates harsh shadows on the face of the foreground subjects. Top only lighting also greatly exaggerates wrinkles in the face and clothes. The result is an uncomplimentary and poor quality vide image.

In the past, a light was attached to the video camera in an attempt to correct this condition. Unfortunately, this technique proved to be unsuccessful for a number of reasons including the following: 1. Often lights of between about 100 and 250 watts were employed. The intensity of such lights forced a smaller lens aperture setting which, as a result, caused the background to become overly dark. The result was of as poor quality as no light at all. 2. These lights were often big and bulky. 3. The power drain of these large lights required additional batteries and cables which negated the portability of compact, one-piece camcorders.

A solution to this problem has been to provide a low voltage bulb for situations where battery operation is required. A light module incorporating a low voltage bulb was disclosed in U.S. Pat. No. 4,554,621 ('621) entitled "MODULAR LIGHT ASSEMBLY" assigned to a common assignee with the present invention. This modular light has proven to be very effective in overcoming the problems indicated hereinbefore. However, the modular light covered by the '621 patent was added to video cameras as an aftermarket accessory. This resulted in the following additional problems which the present invention has sought to overcome. 1. Many camera operators still experience poor video quality and may not associate the lack of quality with the need for a fill in light. Instead they either blame their own competence or the camera itself. 2. Even though the modular light disclosed in the '621 patent is quite small and compact, when attached to a camera, it can physically interfere with other camera features and functions and possibly prevent the camera from fitting into the carrying case. Furthermore, the mounting hardware required for any accessory light adds a degree of weight and bulk which could be found objectionable.

It is a problem underlying the present invention to provide a video camera with an integral light which obviates one or more of the limitations and disadvantages of the described prior arrangements.

It is a further advantage of the present invention to provide a video camera with an integral light wherein the light is pivotally mounted on the video camera body.

It is a still further advantage of the present invention to provide a video camera with an integral light wherein the light can be disposed in a stored, non-use position.

It is a yet further advantage of the present invention to provide a video camera with a integral light wherein the light can be easily positioned by the camera operator and held in place by a pivot mechanism associated with the light.

It is a yet further advantage of the present invention to provide a video camera with an integral light wherein the light can be automatically operated in conjunction with the video tape.

It is also an advantage of the present invention to provide a pivotally mounted light integrally with a video camera body wherein the common power source operates both the light and the camera.

SUMMARY OF THE INVENTION

In accordance with the invention, a video camera comprises a video camera body in combination with a light module. A first means, integral with said video camera body, is provided for mounting the light module to the camera body. The first means includes a pivotal connection means for selectively positioning the light module.

The pivotal connection means enables the light module to pivot from one end location where the light module is in a first position, through a range of intermediate locations placing the light module in a range of positions, and finally to a second end location where the light module is disposed in a stored, non-use position.

By building the light module as an integral part of the camera body, such as in the handle, the size and weight can be reduced to relatively insignificant proportions.

Another significant feature of a built-in design is an automatic control feature which causes the light to only operate when the video tape is rolling. This is significant because it saves power when the tape is stopped. The automatic control can be incorporated in the internal camera circuitry or be attached to the power source through extra circuits.

The disclosed design can further use a common power source, either internal or external, with the camera.

BRIEF DESCRIPTION OF THE DRAWINGS

Further objects and advantages of the invention will become apparent from the following description and claims, and from the accompanying drawings, wherein:

FIG. 5 is an exploded, perspective view of a clutch assembly in accordance with the present invention forming a part of the electrical socket;

FIG. 6 is a diagrammatic view of the pivotally mounted electrical socket illustrating the range of movement it can achieve;

FIG. 7 is a view of a switch mounted onto the handle of a video camera;

FIG. 8 is a circuit diagram of a modular light assembly using internal camera circuitry; and FIG. 9 is a circuit diagram of a modular light assembly using external camera circuitry.

DETAILED DESCRIPTION OF THE PREFERRED EMBODIMENT

Figure 1:
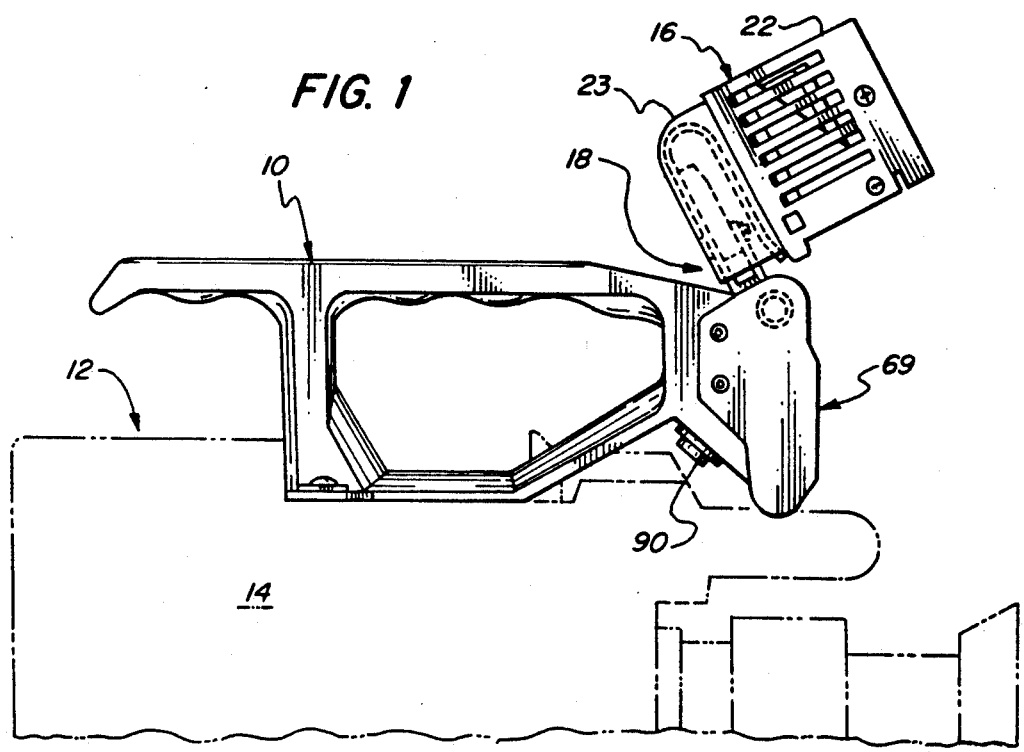
FIG. 1 is a diagrammatic view of a modular light assembly of the present invention mounted on a video camera in an operating position.

Referring now to the drawings in detail, wherein like numerals indicate like elements throughout the several views, the video camera with integral modular light assembly of the present invention is illustrated in FIG.'s 1 and 2 by the numeral 10.

Figure 2:
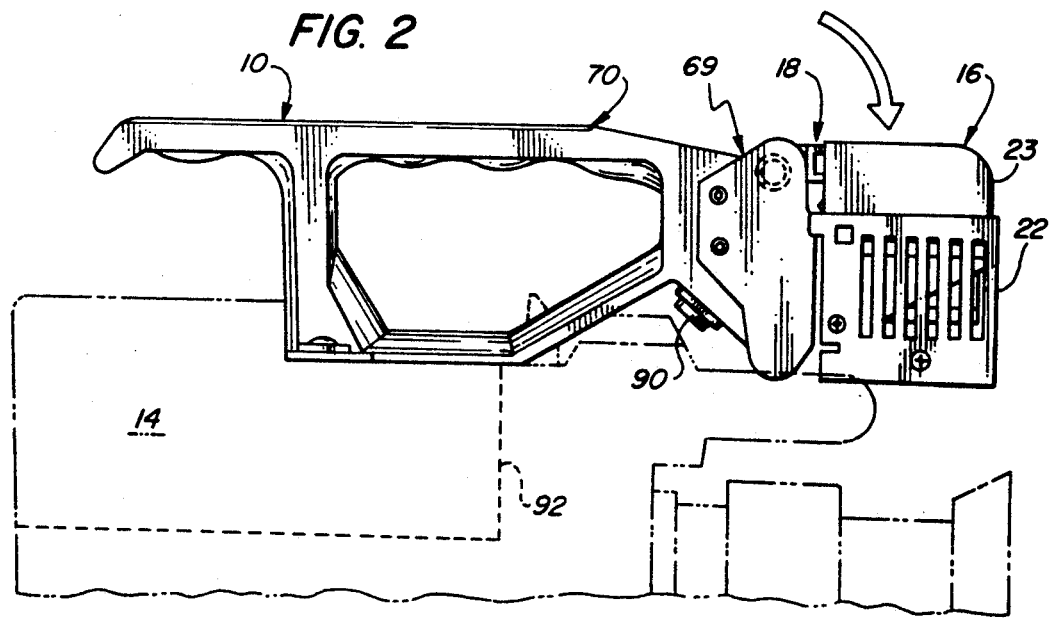
FIG. 2 is a diagrammatic view of a modular light assembly of the present invention mounted on a video camera in a stored position.

The video camera 12, as best seen in FIG.'s 1-3, comprises the combination of video camera body 14 and a modular light assembly 16. The modular light assembly can be pivotally attached to the video camera body 14 by any desired means to enable the light to be easily positioned by the operator of the camera. The pivotal means can include a clutch mechanism 42 so that the light remains in its set position. When not in use, the light can be placed in a stored position as seen in FIG. 2.

The modular light assembly 16 can also be pivotally attached to the camera body 14 by means of an electrical clip and socket subassembly 18 integrally connected to the camera body 14. The electrical clip and socket subassembly 18 includes a pivotal connector 20 for selectively positioning the modular light assembly 16.

As particularly disclosed in U.S. Pat. No. 4,554,621, the modular light assembly 16 includes a light module 22 adapted to be slidably received and removable from the electrical clip and socket subassembly 18. The clip and socket subassembly 16 are pivotally mounted at one end 24, as best seen in FIG.'s 4 and 6, to a mounting block 69. The clip and socket subassembly 18 is formed from a clip of resilient metal having a front leg portion 26, a top leg portion 28 and a rear leg portion 30. A bottom leg portion 32 extends outwardly from the rear leg portion 30. The clip terminates in an upright leg portion 34 somewhat shorter than, but substantially parallel to the rear leg 30. A threaded fastener 36 secures a dielectric housing member 38 between parallel legs 30 and 34. A pivot block 40 is affixed to the bottom leg portion 32.

Figure 4:
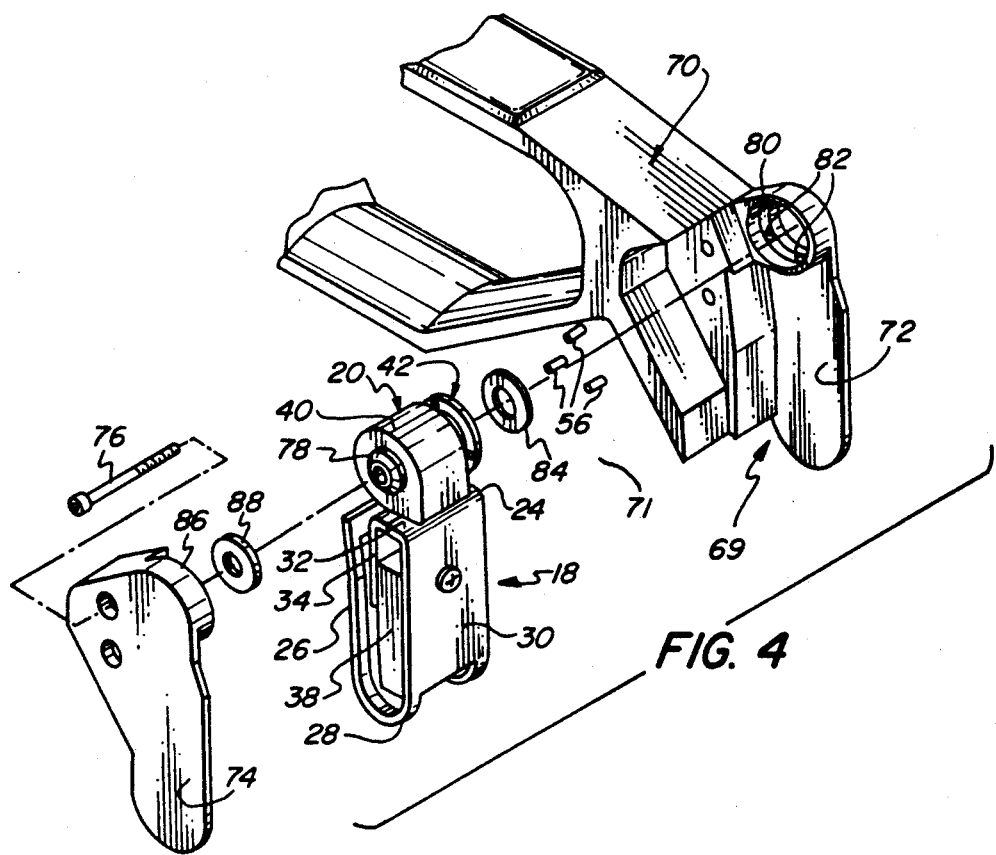
FIG. 4 is an exploded, perspective view of the handle of a video camera, in accordance with the present invention, incorporating a pivotal electrical socket.

Referring to FIG. 5, the details of the clutch mechanism 42, secured to pivot block 40, are illustrated. Two braking rings 44 having central openings 46, keyed to the projecting surface 50, prevent turning with respect to the pivot block 40. Two drive washers 52 include a mean of being keyed such as pin holes 54 which receive pins 56, as seen in FIG. 4. A plurality of fiber discs 58 are positioned to create friction and to prevent rubbing between the metal discs 44 and 52. A plurality of springs 60 are disposed in bores 62 and project outward to apply pressure to all of the discs and rings which are used in constructing the clutch 42. The assembly of the rings and discs are held in place by a press-in-plug 48 having a splined lug 64 which is received in a bore 66 of pivot block 40.

In FIG. 4, there is illustrated a mounting block 69 having a chamber 71 formed between two side walls 72 and 74. The chamber can be integrally formed in the camera body such as by molding it into the handle. For example, one side wall 72 of the chamber can be molded into handle 70. Then, the other side wall 74 can be attached with means such as screws 76 to the other side wall 72 with the pivot block and other elements disposed therebetween.

It is also within the terms of the invention to form a handle of two mating halves which can include a side wall mounted on each. When the mating halves are attached, the chamber 71 is formed.

Referring again to FIG. 4, the pivot block 40 includes centering bushing 78 projecting from one end of the block 40. The pivot block is preferably constructed to be integral with the handle 70. One side 72 of the handle 70 includes a circular bore 80 adapted to receive the clutch attached to the pivot block 40. The pins 56 are received within bores 82 which in turn are disposed within bore 80. A belleville or wave-washer type spring 84, disposed between the bore 89 and the clutch 42, secures the pivot block 40 axially. The other end of the pivot block is received in a circular bore 86 in side wall 74 which in turn is attached by any conventional means to handle 72. A bushing 88 is provided to coact with the centering bushing 78.

In operation, the clip and socket subassembly 18 can be pivoted outward from a stored position within walls 72 and 74 of the handle 70, as shown in FIG. 6. The drive washers are keyed by the pins 56, or similar means and secured in place by circular bore 80. The springs 60 apply pressure and, in conjunction with the friction generated by the fiber discs 58, provide a predetermined torque enabling the clip and socket subassembly 18 to smoothly pivot to any selected location and remain in that location until another location is selected. This is an important feature because the cameraman can adjust the position of the light with one hand while operating the camera.

The dielectric housing member 38, as more fully described in U.S. Pat. No. 4,554,621, can include a pair of parallel slots which are adapted to receive the parallel contact pins extending from the rear of a lamp or bulb until contact is made with a pair of spring, electrically conductive, contact elements provided in each of the parallel slots. The contact elements are each connected by a suitable electric wire 98 to a manually-operated switch 90. The switch 90 can be located on the underside of the handle 70, as seen in FIG. 6. However, it is within the terms of the present invention to dispose the switch in any desired location on the camera. Moreover, it is further within the terms of the present invention to operate the modular light directly by the camera so that an external switch is unnecessary.

The switch 90 is preferably a three way switch, as seen in FIG. 7, which includes "MANUAL ON", "MANUAL OFF" and "AUTOMATIC" positions The "ON" and "OFF" positions simply turn the light on and off. The "AUTOMATIC" position integrates the start signal for operating the camera to record on video tape with an "ON" switch for the light. This feature provides light only when the camera is being operated. The advantage is the conservation of battery power and bulb life.

Referring to FIG. 8, there is shown a circuit schematic of a modular light assembly incorporating the automatic feature and conventional camera circuitry. The automatic feature can incorporate two low on resistance field effect transistors (FET's) 100, 102 for turning on a bulb in a modular light 16 such as an 85 watt maximum EYF/FPA or EYC/FPB type bulb. The three position toggle switch 90 is of the small signal variety and is used to turn the FET's on and off which turn the light bulb on and off. It is noteworthy, that the automatic feature is not designed to be used in high wattage and high voltage applications, such as 200 watt 30 volt applications.

The supply voltage for the circuitry is taken directly from the battery which can be internally provided in the camera or external to the camera. Typically, the supply voltage is regulated at an internal printed circuit board to 15 volts DC maximum. The control circuitry contains a comparator input circuit 104 for level shifting the signal from a momentary video tape recorder (VTR) Start/Stop pushbutton switch typically disposed in the camera lens to the control circuitry in the light 16. The input circuit 104 also contains a debounce circuit to prevent erroneous triggering by the VTR Start/Stop switch It is believed that this input configuration should adapt to most other applications. Connected to the input comparator circuit 104 is a flip/flop latch circuit 108 which latches the signal to keep the light on when the button 106 is released.

A soft start circuit 110 incorporating a RC time constant is connected between the latch circuit and the gate circuit of the FET's 100 and 102 so that the FET's turn on more slowly in order to provide a soft-start for the light bulb. The soft start reduces the initial surge current seen at the battery terminals by a measured 10 amps maximum.

A low battery override circuit 112 is included in the light circuitry to prevent FET failures. Failures occur when the FET's enter a quasi on state due to reduced gate drive as the battery voltage falls. The FET junction temperature exceeds rated specifications and the device is destroyed. Over dissipated FET's may cause damage to other parts in the handle or the camera in the finished product. The low battery voltage override circuit turns the light off if the battery dips below 8 volts and prevents the aforementioned failures from occurring.

Referring to FIG. 9, a circuit design 113 is illustrated using some internal camera circuitry from a conventional video camera. Identical elements are given the same reference numeral throughout the drawings. Two FET's 100, 102 are provided to turn the light on and off. The camera can have internal circuitry that can provide a latch circuit 114 for latching FET's. The latch circuit corresponds to latch circuit 108 illustrated in FIG. 8. The circuit components corresponding to 104, 106 and 112, as illustrated in FIG. 8, are provided internally of the camera. The remainder of the circuit 113 is substantially the same. The level shift circuit can be incorporated in the soft start circuit, if desired, as shown in circuit block 116.

Figure 3:
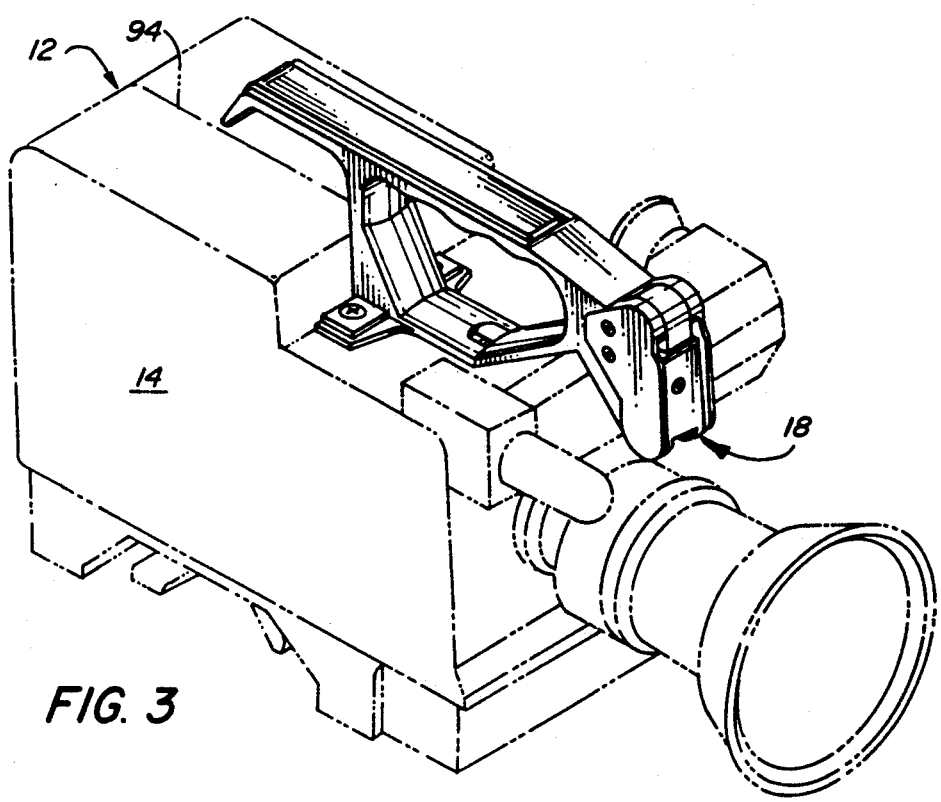
FIG. 3 is a perspective view of a pivotally mounted electrical socket of the present invention mounted on the handle of a video camera in a stored away position.

Referring to FIG. 2, there is shown a schematic representation of a video camera with a dotted representation of the internal wiring 92 between the three way switch 90 and a relay circuit which activates the camera. FIG. 3 is suitable for retrofitting a video camera without internal wiring so as to incorporate the light. In this instance, an external wire 94 is illustrated as being connected between the handle and a power supply or battery at the back of the camera body.

The combination video camera and light, as illustrated in FIG. 1, shows the light in an upright, operable position. The light can pivot up and down through an arc of about 120 degrees. When the light is not in use or is stored for transporting purposes, the light can be pivoted to a second location, as seen in FIG. 2, where it assumes a contour which matches the outline of the camera. In this position, the camera can easily be stored in a camera case. Further the lens of the light can readily be protected from damage.

As seen in FIG. 3, the light can be removed and the electrical socket can be stored in the chamber 70 where it is unobtrusive and does not protrude to create a potential hinderance in operating or transporting the camera.

Although the camera light is preferably attached to the handle, as illustrated, it is also within the terms of the present invention to integrate the mounting block with the chamber structure to store the electrical conductor element in any desired location on the camera body. Further the mounting block with the chamber structure could be mounted to the video camera by conventional means such as for example studs or shoes.

In addition, a non-removable light module can be pivotally attached to the body of the video camera. For example, the non-removable light module can be attached to the handle substantially as illustrated in FIGS. 1 and 2.

The patent disclosed herein is incorporated by reference in its entirety to this specification.

It is apparent that there has been provided in accordance with the present invention a combination video camera and light which satisfies the objects, means, and advantages set forth hereinabove. While the invention has been described in combination with the embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A video camera system comprising:
   a camera body;
   a clip and socket assembly;
   a light module slidably and removably mounted on said clip and socket assembly;
   means for pivotally mounting said clip and socket assembly directly onto said camera body such that said light module when mounted on said clip and socket assembly can be pivoted from an upright position to a storage position, said means including a pivotal connector, said pivotal connector having a clutch for securing the clip and socket assembly in a selected position and providing for smooth pivotal adjustment;
   said camera body further including a mounting block including a first wall and a second wall spaced apart from and facing said first wall, the walls defining a surface being substantially parallel and having a length substantially corresponding to the length of the clip and socket assembly, and the walls forming a chamber within said mounting block between said first and second walls for receiving and storing said clip and socket assembly when said light module is removed therefrom and said clip and socket assembly is pivoted to a storage position, wherein said pivotal connector is located within said chamber.

2. The video camera system of claim 1 wherein said camera body includes a carrying handle and said mounting block is a part of said handle and said clip and socket assembly is pivotally mounted on said mounting block.

3. The video camera system of claim 1, wherein said pivotal connector comprises a pivot block coupled to said clip and socket assembly and coupled to said clutch for rotational movement with respect to said mounting block to pivot said clip and socket assembly between an upright and storage position.

4. A video camera system comprising:
a camera body;
a mounting member integral with the camera body including means for removably mounting a light module to the mounting member and an electrical connection for electrically connecting a light module to at least one of a power source and control circuitry of the video camera, the camera body including a first wall and a second wall spaced apart from and facing the first wall defining a storage chamber, the walls defining a surface being substantially parallel and having a length substantially corresponding to a length of the mounting member; and
means within the storage chamber for pivotally moving the integral mounting member through a plurality of positions for adjusting the position of a light module mounted on the mounting member and for moving the mounting member into the storage chamber for storing the mounting member when not in use, and including adjustable locking means for maintaining the integral mounting member in any of the plurality of positions for maintaining a selected position of a light module mounted on the mounting member.

5. A video camera system as defined in claim 4, wherein the mounting member is a clip and socket assembly.

6. A video camera system as defined in claim 4, further comprising a light module slidably and removably mounted on the mounting member.

7. A video camera system as defined in claim 4, wherein the adjustable locking means for maintaining the integral mounting member in any of the plurality of positions includes a clutch assembly.

8. A video camera system as defined in claim 4, wherein the means for pivotally moving the integral mounting member includes a shaft member coupled to the camera body and a pivot block coupled to the shaft member and the mounting member for pivoting relative to the camera body.

9. A video camera system as defined in claim 8, wherein the adjustable locking means for maintaining the integral mounting member in any of the plurality of positions includes a clutch assembly defining a surface engaging the shaft member by friction.

10. A video camera system comprising:
a camera body;
a light module including a mounting portion integral with and non-removable from the camera body, the mounting portion including means for electrically connecting the light module to at least one of a power source and control circuitry of the video camera, the camera body including a first wall and a second wall spaced apart from and facing the first wall defining a storage chamber, the walls defining a surface being substantially parallel and having a length substantially corresponding to a length of the mounting portion;
means within the storage chamber for pivotally moving the integral mounting portion and light module throughout a plurality of positions for adjusting the position of the light module, and for moving the mounting portion into the storage chamber for storing the mounting portion when the light module is removed; and
adjustable locking means for maintaining the integral mounting portion and the light module in any of the plurality of positions for maintaining a selected position of the light module.

11. A video camera system as defined in claim 10, wherein the means for maintaining the integral mounting portion and the light module in any of the plurality of positions includes a clutch assembly.

12. A video camera system as defined in claim 10, wherein the means for pivotally moving the integral mounting portion and light module includes a shaft member coupled to the camera body and a pivot block coupled to the shaft member and the mounting member for pivoting relative to the camera body.

13. A video camera system as defined in claim 12, wherein the means for maintaining the integral mounting portion and light module in any of the plurality of positions includes a clutch assembly defining a surface engaging the shaft member by friction.

* * * * *